US010659781B2

(12) United States Patent
Li et al.

(10) Patent No.: US 10,659,781 B2
(45) Date of Patent: May 19, 2020

(54) CONCATENATED CODING UNITS IN FLEXIBLE TREE STRUCTURE

(71) Applicant: TENCENT AMERICA LLC, Palo Alto, CA (US)

(72) Inventors: Xiang Li, San Diego, CA (US); Xin Zhao, San Diego, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/232,752

(22) Filed: Dec. 26, 2018

(65) Prior Publication Data

US 2019/0306505 A1 Oct. 3, 2019

Related U.S. Application Data

(60) Provisional application No. 62/651,566, filed on Apr. 2, 2018.

(51) Int. Cl.
*H04N 19/119* (2014.01)
*H04N 19/70* (2014.01)
*H04N 19/64* (2014.01)
*H04N 19/96* (2014.01)

(52) U.S. Cl.
CPC ......... *H04N 19/119* (2014.11); *H04N 19/647* (2014.11); *H04N 19/70* (2014.11); *H04N 19/96* (2014.11)

(58) Field of Classification Search
CPC .... H04N 19/119; H04N 19/647; H04N 19/70; H04N 19/96
See application file for complete search history.

(56) References Cited

U.S. PATENT DOCUMENTS

| 2003/0059118 | A1* | 3/2003 | Suzuki | H04N 19/70 382/233 |
| 2013/0279577 | A1* | 10/2013 | Schwarz | H04N 19/50 375/240.12 |
| 2014/0321539 | A1* | 10/2014 | Tanaka | H04N 19/597 375/240.03 |
| 2015/0023409 | A1* | 1/2015 | Schierl | H04N 19/70 375/240.02 |
| 2017/0347128 | A1* | 11/2017 | Panusopone | H04N 19/174 |

* cited by examiner

*Primary Examiner* — Jonathan R Messmore
(74) *Attorney, Agent, or Firm* — Sughrue Mion, PLLC

(57) ABSTRACT

A method of partitioning a parent coding unit (CU) in a tree structure for encoding a video sequence includes splitting the parent CU into more than two CUs including a first CU and a second CU, and generating a concatenated CU by concatenating the second CU to the first CU.

21 Claims, 11 Drawing Sheets

FIG. 6   Decoder 510

FIG. 7    Encoder 503

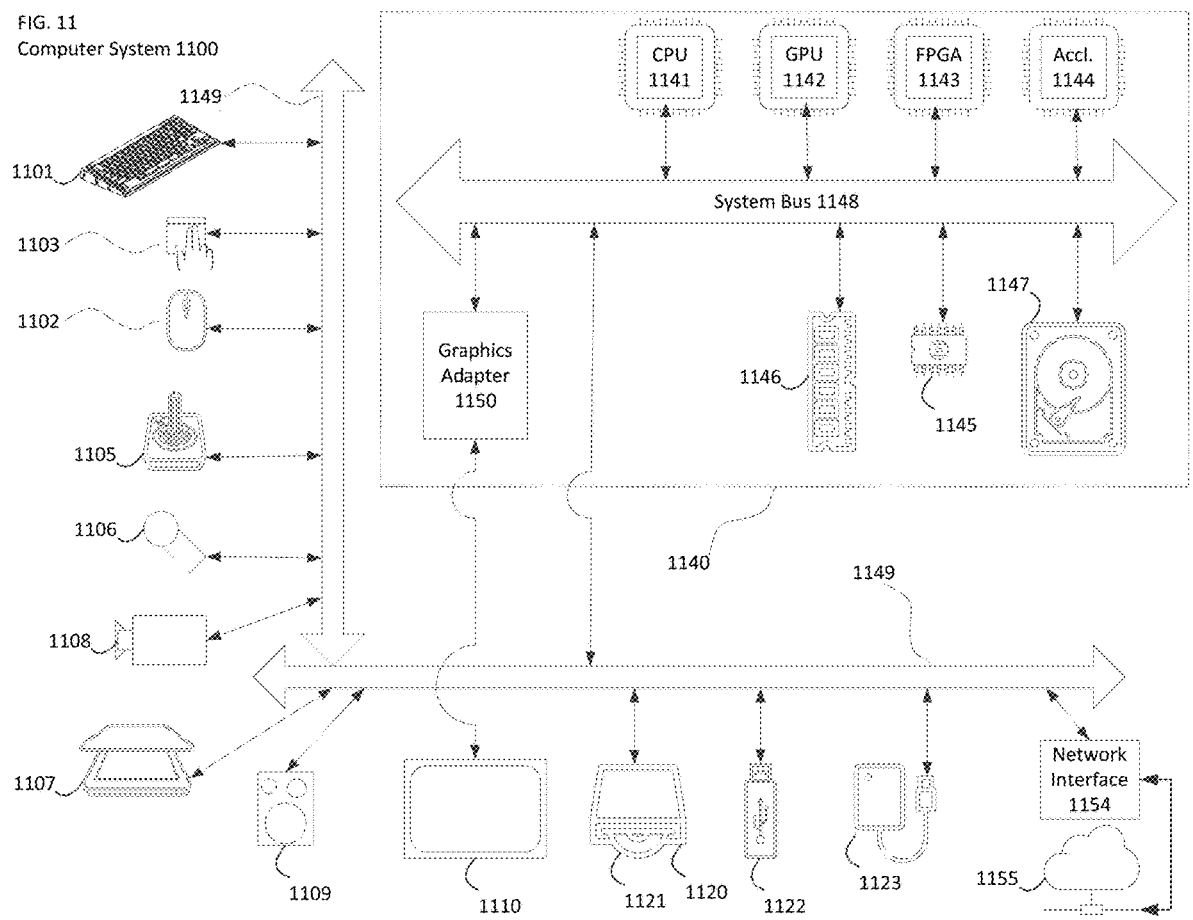

CONCATENATED CODING UNITS IN FLEXIBLE TREE STRUCTURE

CROSS-REFERENCE TO RELATED APPLICATION

This application claims priority from priority under 35 U.S.C. § 119 to U.S. Application No. 62/651,566, filed on Apr. 2, 2018, in the United States Patent & Trademark Office, the disclosure of which is incorporated herein by reference in its entirety.

FIELD

This present disclosure relates to advanced block partitioning in hybrid video coding. More specifically, concatenated coding units (CUs) in a flexible tree structure for efficient block partitioning is disclosed.

BACKGROUND

ITU-T VCEG (Q6/16) and ISO/IEC MPEG (JTC 1/SC 29/WG 11) published the H.265/HEVC (High Efficiency Video Coding) standard in 2013 (version 1) 2014 (version 2) 2015 (version 3) and 2016 (version 4). Since then they have been studying the potential need for standardization of future video coding technology with a compression capability that significantly exceeds that of the HEVC standard (including its extensions). The groups are working together on this exploration activity in a joint collaboration effort known as the Joint Video Exploration Team (JVET) to evaluate compression technology designs proposed by their experts in this area. A Joint Exploration Model (JEM) has been developed by JVET to explore the video coding technologies beyond the capability of HEVC, and the current latest version of JEM is JEM-7.0. As JEM software has shown significant improvement over HEVC reference software HM, a joint Call for Proposal on video compression with capability beyond HEVC was issued in October 2017. A new generation of video coding standard is being under development.

In HEVC, a coding tree unit (CTU) is split into coding units (CUs) by using a quadtree structure denoted as coding tree to adapt to various local characteristics. The decision whether to code a picture area using inter-picture (temporal) or intra-picture (spatial) prediction is made at the CU level. Each CU can be further split into one, two or four prediction units (PUs) according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure like the coding tree for the CU. One of key feature of the HEVC structure is that it has the multiple partition conceptions including CU, PU, and TU. In HEVC, a CU or a TU can only be square shape, while a PU may be square or rectangular shape for an inter predicted block. In later stage of HEVC some contributions proposed to allow rectangular shape PUs for intra prediction and transform. These proposals were not adopted to HEVC but extended to be used in JEM.

At picture boundary, HEVC imposes implicit quad-tree split so that a block will keep quad-tree splitting until the size fits the picture boundary.

Inspired by previous work, a Quad-tree-Binary-tree (QTBT) structure was developed to unify the concepts of the CU, PU and TU and supports more flexibility for CU partition shapes. In QTBT block structure, a CU can have either a square or rectangular shape. As shown in FIG. 1, a coding tree unit (CTU) is first partitioned by a quadtree structure. The quadtree leaf nodes are further partitioned by a binary tree structure. There are two splitting types, symmetric horizontal splitting and symmetric vertical splitting, in the binary tree splitting. The binary tree leaf nodes are called coding units (CUs), and that segmentation is used for prediction and transform processing without any further partitioning. This means that the CU, PU and TU have the same block size in the QTBT coding block structure. In JEM, a CU sometimes consists of coding blocks (CBs) of different colour components, e.g. one CU contains one luma CB and two chroma CBs in the case of P and B slices of the 4:2:0 chroma format and sometimes consists of a CB of a single component, e.g., one CU contains only one luma CB or just two chroma CBs in the case of I slices.

The following parameters are defined for the QTBT partitioning scheme.

CTU size: the root node size of a quadtree, the same concept as in HEVC
MaxQTDepth: the maximum allowed quad-tree depth
MinQTSize: the minimum allowed quadtree leaf node size
MaxBTSize: the maximum allowed binary tree root node size
MaxBTDepth: the maximum allowed binary tree depth
MinBTSize: the minimum allowed binary tree leaf node size In one example of the QTBT partitioning structure, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quadtree partitioning is applied to the CTU first to generate quadtree leaf nodes. The quadtree leaf nodes may have a size from 16×16 (i.e., the MinQTSize) to 128×128 (i.e., the CTU size). If the leaf quadtree node is 128×128, it will not be further split by the binary tree since the size exceeds the MaxBTSize (i.e., 64×64). Otherwise, the leaf quadtree node could be further partitioned by the binary tree. Therefore, the quadtree leaf node is also the root node for the binary tree and it has the binary tree depth as 0. When the binary tree depth reaches MaxBTDepth (i.e., 4), no further splitting is considered. When the binary tree node has width equal to MinBTSize (i.e., 4), no further horizontal splitting is considered. Similarly, when the binary tree node has height equal to MinBTSize, no further vertical splitting is considered. The leaf nodes of the binary tree are further processed by prediction and transform processing without any further partitioning. In the JEM, the maximum CTU size is 256×256 luma samples.

FIG. 1 (left) illustrates an example of block partitioning by using QTBT, and FIG. 1 (right) illustrates the corresponding tree representation. The solid lines indicate quadtree splitting and dotted lines indicate binary tree splitting. In each splitting (i.e., non-leaf) node of the binary tree, one flag is signalled to indicate which splitting type (i.e., horizontal or vertical) is used, where 0 indicates horizontal splitting and 1 indicates vertical splitting. For the quadtree splitting, there is no need to indicate the splitting type since quadtree splitting always splits a block both horizontally and vertically to produce 4 sub-blocks with an equal size.

In addition, the QTBT scheme supports the ability for the luma and chroma to have a separate QTBT structure. Currently, for P and B slices, the luma and chroma CTBs in one CTU share the same QTBT structure. However, for I slices, the luma CTB is partitioned into CUs by a QTBT structure, and the chroma CTBs are partitioned into chroma CUs by another QTBT structure. This means that a CU in an I slice consists of a coding block of the luma component or coding blocks of two chroma components, and a CU in a P or B slice consists of coding blocks of all three colour components.

In HEVC, inter prediction for small blocks is restricted to reduce the memory access of motion compensation, such that bi-prediction is not supported for 4×8 and 8×4 blocks, and inter prediction is not supported for 4×4 blocks. In the QTBT of the JEM, these restrictions are removed.

Multi-type-tree (MTT) structure is a more flexible tree structure than QTBT. In MTT, tree types other than quad-tree (QT) and binary-tree (BT) are supported. A horizontal and vertical center-side ternary trees (TT) are introduced, as shown in FIG. 2(d) and FIG. 2(e), respectively.

FIG. 2(a) illustrates an example of a quad-tree partitioning. FIG. 2(b) illustrates an example of a vertical binary-tree partitioning. FIG. 2(c) illustrates an example of a horizontal binary-tree partitioning. FIG. 2(d) illustrates an example of a vertical center-side ternary tree partitioning. FIG. 2(e) illustrates an example of a horizontal center-side ternary tree partitioning.

There are two levels of trees, region tree (quad-tree) and prediction tree (binary-tree or ternary tree). A CTU is firstly partitioned by region tree (RT). A RT leaf may be further split with prediction tree (PT). A PT node may also be further split with PT until max PT depth is reached. After entering PT, RT (quad-tree) cannot be used anymore. A PT leaf is the basic coding unit. It is still called CU for convenience. A CU cannot be further split. Prediction and transform are both applied on CU in the same way as JEM-3 or QTBT.

Benefits of ternary tree partitioning may include that, as a complement to quad-tree and binary-tree partitioning, ternary tree partitioning can capture objects which locate in block center while quad-tree and binary-tree are always splitting along block center. Also, the width and height of the partitions of the proposed ternary trees are always power of 2 so that no additional transforms are needed.

The design of two-level tree is mainly motivated by complexity reduction. Theoretically, the complexity of traversing of a tree is $T^D$, where T denotes the number of split types, and D is the depth of tree. With the design of two level tree and restrict the first level is quad-tree only (reduce the number of T at certain levels), the complexity is reduced a lot while keeping a reasonable performance.

To further improve the coding efficiency on top of QTBT, asymmetric binary tree (ABT) is proposed. As shown in FIG. 3, a coding unit with size S is divided into 2 sub-CU with sizes S/4 and 3×S/4, either in the horizontal or in the vertical direction. In practice the added available CU sizes are 12 and 24. In a further extended version of the tool CU sizes 6 and 48 may be allowed.

One major issue with this method is that it is inconvenient if width/height of a block is not a power of 2. For example, transforms with size like 12 and 24 need to be supported. Special handling may also be needed when splitting a block with width/height being not a power of 2.

Using a SplitToSquare tree type, a block is split into largest same-size square sub-blocks. That is, if the input block is a rectangular block with the size of $2^M \times 2^N$ (M≠N), after SplitToSquare, we will have $2^{M+N-2\times min(M,N)}$ sub-blocks whose size are $2^{min(M,N)} \times 2^{min(M,N)}$. If the input block is a square block, Split2ToSquare leads to four square same-size sub-blocks, which is the same as the quad-tree split. Basically, SplitToSquare may be used to replace the quad-tree split as it covers more cases.

SUMMARY

In an embodiment, there is provided a method of partitioning a parent coding unit (CU) in a tree structure for encoding a video sequence, the method including splitting the parent CU into more than two CUs including a first CU and a second CU, and generating a concatenated CU by concatenating the second CU to the first CU.

In an embodiment, there is provided a device for partitioning a parent coding unit (CU) in a tree structure for encoding a video sequence, the device including at least one memory configured to store program code, and at least one processor configured to read the program code and operate as instructed by the program code, the program code including splitting code for splitting the parent CU into more than two CUs including a first CU and a second CU; and generating code for generating a concatenated CU by concatenating the second CU to the first CU.

In an embodiment, there is provided a non-transitory computer-readable medium storing instructions, the instructions comprising: one or more instructions that, when executed by one or more processors of a device for partitioning a parent coding unit (CU) in a tree structure for encoding a video sequence, cause the one or more processors to split the parent CU into more than two CUs including a first CU and a second CU, and generate a concatenated CU by concatenating the second CU to the first CU.

BRIEF DESCRIPTION OF THE DRAWINGS

Further features, the nature, and various advantages of the disclosed subject matter will be more apparent from the following detailed description and the accompanying drawings in which:

FIG. 11 is a diagram of a computer system in accordance with an embodiment.

PROBLEM TO BE SOLVED

Figure 1:
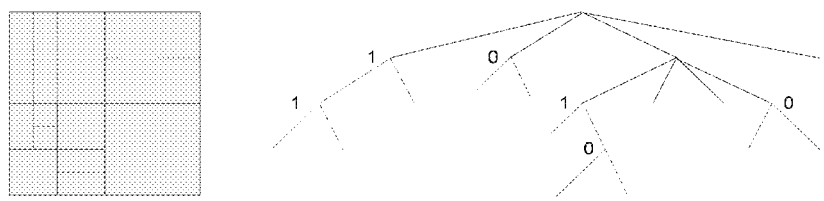
FIG. 1 is an illustration of a QTBT structure.
Figure 2:
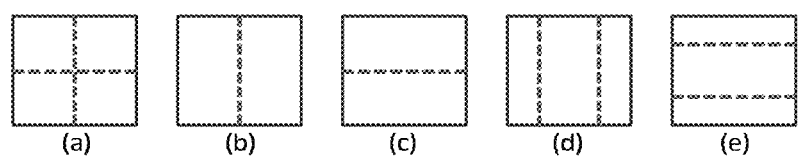
FIG. 2(a) through FIG. 2(e) are illustrations of various partitioning structures.
Figure 3:
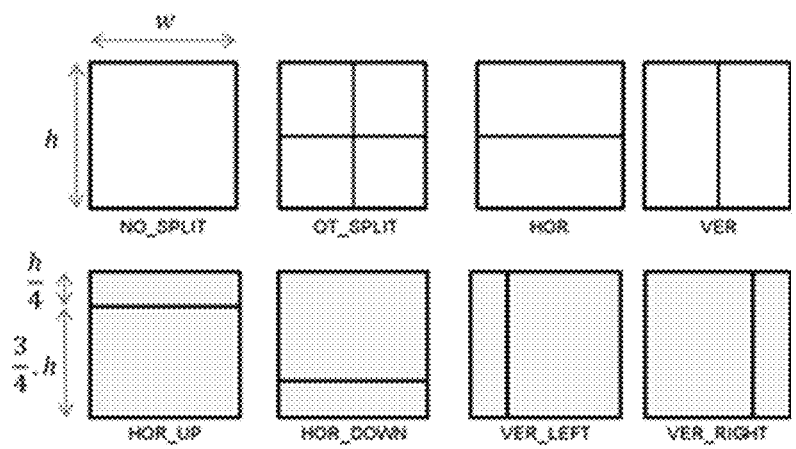
FIG. 3 is an illustration of various CU splitting modes

Although ABT shows coding efficiency improvement, it has much overlap with TT. For example, the first partition of HOR_UP FIG. 3 is duplicated with the first partition FIG. 2(e). As this partition can be further split into smaller sub-blocks, the complexity overlap during encoder partition search is actually very high.

Although the MTT (including ABT and SplitToSquare) structure is flexible, it is still not efficient enough to capture irregular objects in videos.

DETAILED DESCRIPTION

Figure 4:
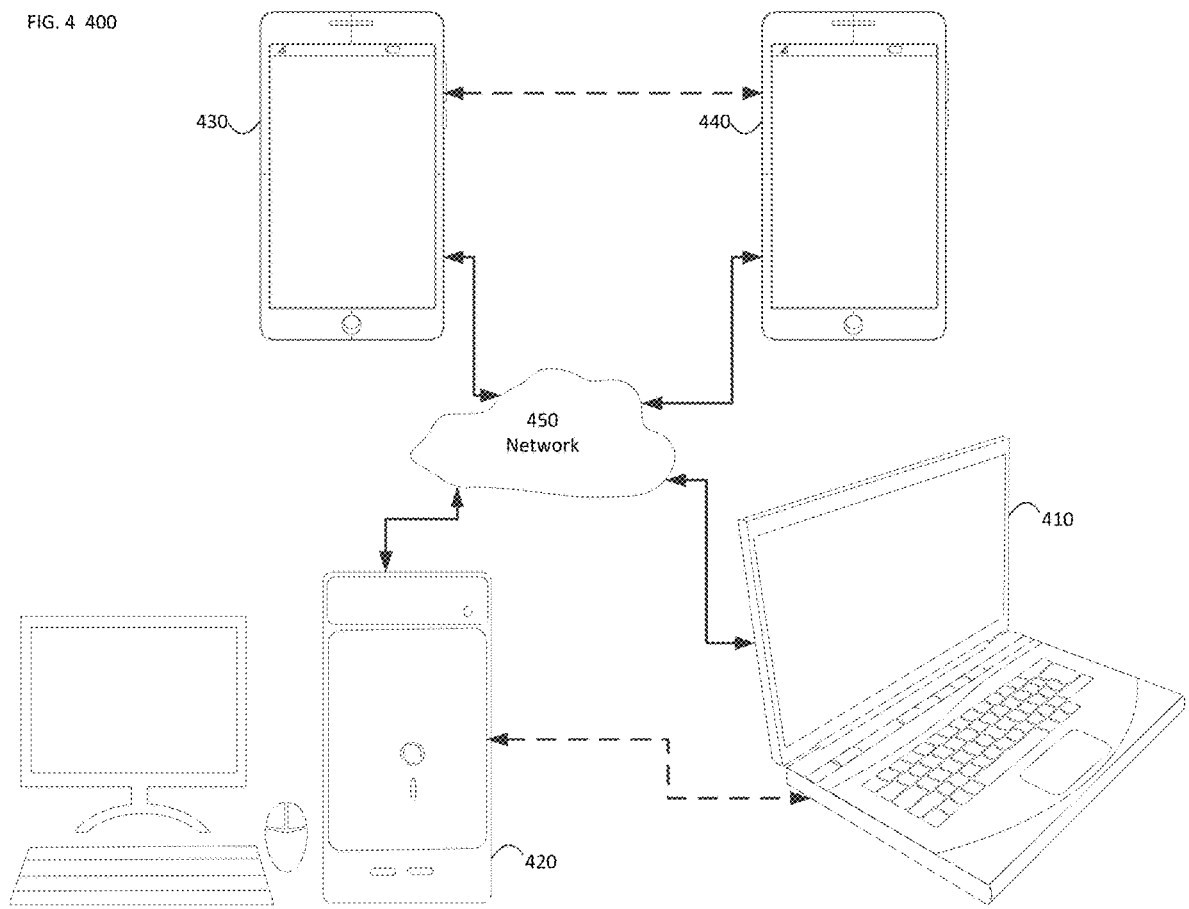
FIG. 4 is a simplified block diagram of a communication system according to an embodiment of the present disclosure.

FIG. 4 illustrates a simplified block diagram of a communication system (300) according to an embodiment of the present disclosure. The communication system (300) may include at least two terminals (410-420) interconnected via a network (450). For unidirectional transmission of data, a first terminal (410) may code video data at a local location for transmission to the other terminal (420) via the network (450). The second terminal (420) may receive the coded video data of the other terminal from the network (450), decode the coded data and display the recovered video data. Unidirectional data transmission may be common in media serving applications and the like.

FIG. 4 illustrates a second pair of terminals (430, 440) provided to support bidirectional transmission of coded video that may occur, for example, during videoconferencing. For bidirectional transmission of data, each terminal (430, 440) may code video data captured at a local location for transmission to the other terminal via the network (450). Each terminal (430, 440) also may receive the coded video data transmitted by the other terminal, may decode the coded data and may display the recovered video data at a local display device.

In FIG. 4, the terminals (410-440) may be illustrated as servers, personal computers and smart phones but the principles of the present disclosure are not so limited. Embodiments of the present disclosure find application with laptop computers, tablet computers, media players and/or dedicated video conferencing equipment. The network (450) represents any number of networks that convey coded video data among the terminals (410-440), including for example wireline and/or wireless communication networks. The communication network (450) may exchange data in circuit-switched and/or packet-switched channels. Representative networks include telecommunications networks, local area networks, wide area networks and/or the Internet. For the purposes of the present discussion, the architecture and topology of the network (450) may be immaterial to the operation of the present disclosure unless explained herein below.

Figure 5:
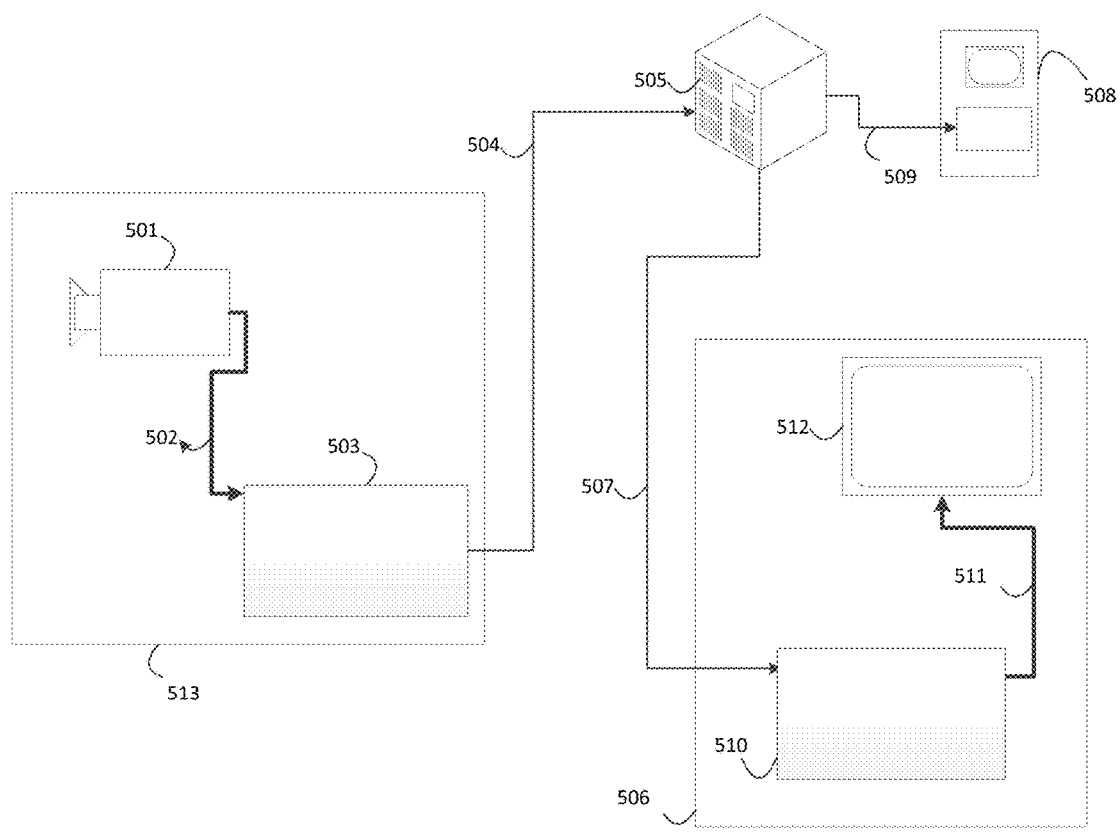
FIG. 5 is a diagram of the placement of a video encoder and decoder in a streaming environment.

FIG. 5 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (513), that can include a video source (501), for example a digital camera, creating, for example, an uncompressed video sample stream (502). That sample stream (502), depicted as a bold line to emphasize a high data volume when compared to encoded video bitstreams, can be processed by an encoder (503) coupled to the camera (501). The encoder (503) can include hardware, software, or a combination thereof to enable or implement aspects of the disclosed subject matter as described in more detail below. The encoded video bitstream (504), depicted as a thin line to emphasize the lower data volume when compared to the sample stream, can be stored on a streaming server (505) for future use. One or more streaming clients (506, 508) can access the streaming server (505) to retrieve copies (507, 509) of the encoded video bitstream (504). A client (506) can include a video decoder (510) which decodes the incoming copy of the encoded video bitstream (507) and creates an outgoing video sample stream (511) that can be rendered on a display (512) or other rendering device (not depicted). In some streaming systems, the video bitstreams (504, 507, 509) can be encoded according to certain video coding/compression standards. Examples of those standards include ITU-T Recommendation H.265. Under development is a video coding standard informally known as Versatile Video Coding (VVC). The disclosed subject matter may be used in the context of VVC.

Figure 6:
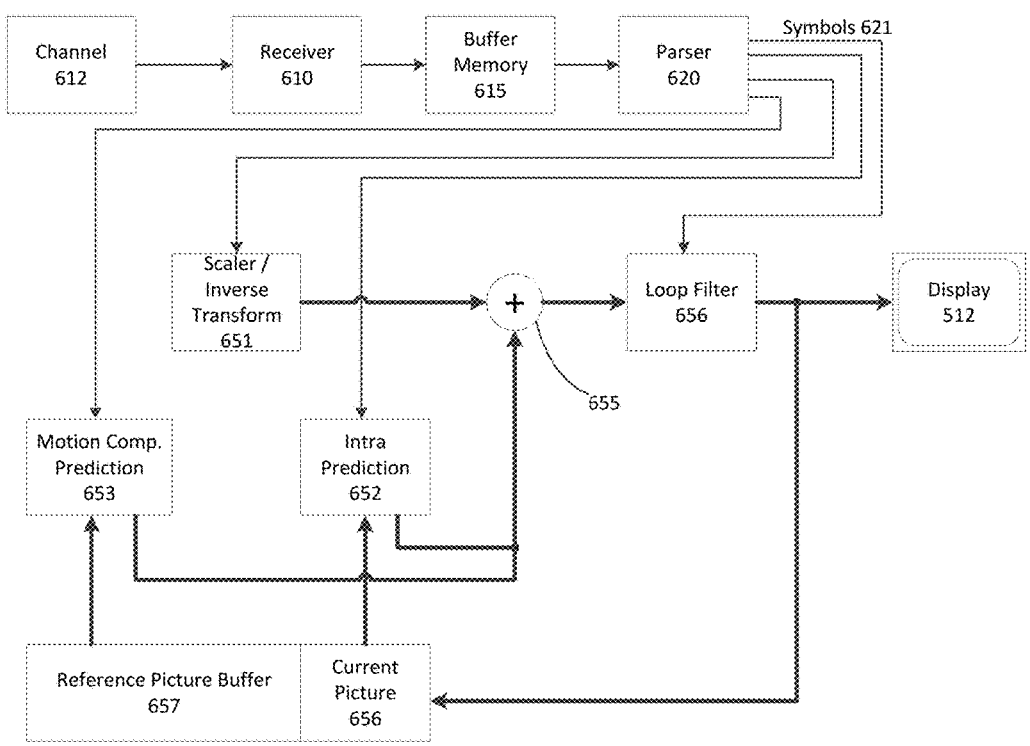
FIG. 6 is a functional block diagram of a video decoder according to an embodiment of the present disclosure.
Figure 7:
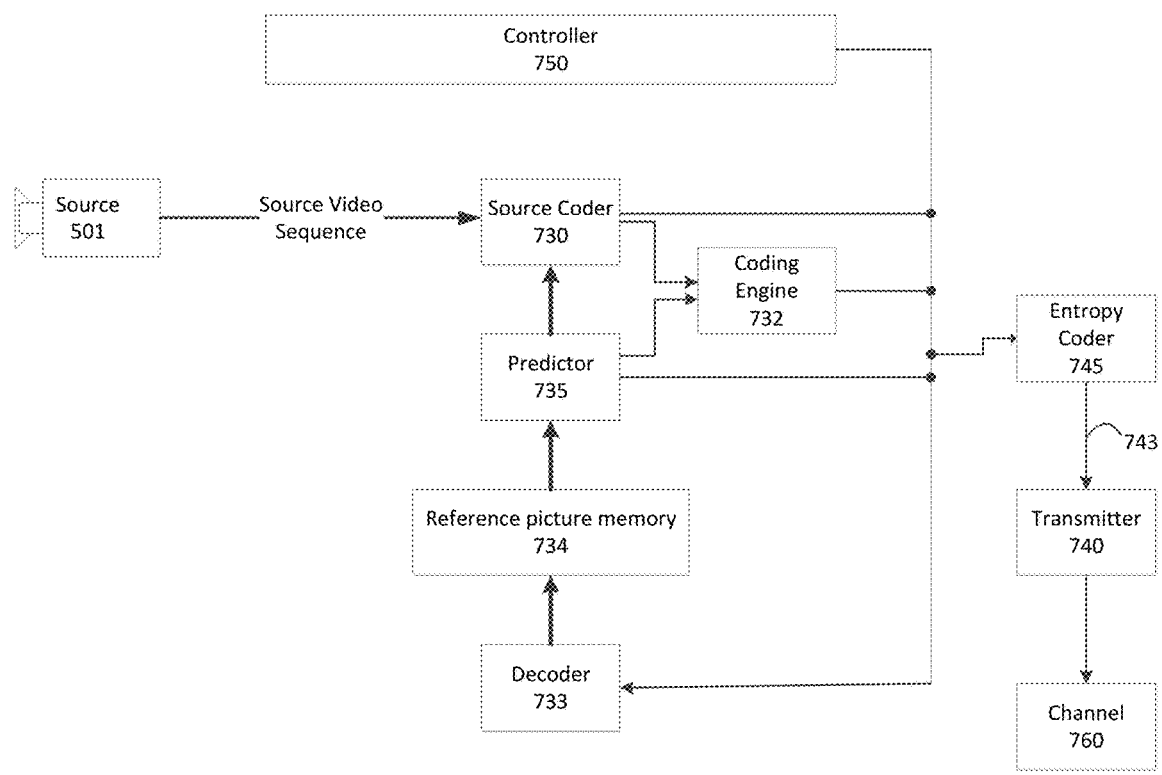
FIG. 7 is a functional block diagram of a video encoder according to an embodiment of the present disclosure.

FIG. 6 may be a functional block diagram of a video decoder (510) according to an embodiment of the present invention.

A receiver (610) may receive one or more codec video sequences to be decoded by the decoder (510); in the same or another embodiment, one coded video sequence at a time, where the decoding of each coded video sequence is independent from other coded video sequences. The coded video sequence may be received from a channel (612), which may be a hardware/software link to a storage device which stores the encoded video data. The receiver (610) may receive the encoded video data with other data, for example, coded audio data and/or ancillary data streams, that may be forwarded to their respective using entities (not depicted). The receiver (610) may separate the coded video sequence from the other data. To combat network jitter, a buffer memory (615) may be coupled in between receiver (610) and entropy decoder/parser (620) ("parser" henceforth). When receiver (610) is receiving data from a store/forward device of sufficient bandwidth and controllability, or from an isosychronous network, the buffer (615) may not be needed, or can be small. For use on best effort packet networks such as the Internet, the buffer (615) may be required, can be comparatively large and can advantageously of adaptive size.

The video decoder (510) may include a parser (620) to reconstruct symbols (621) from the entropy coded video sequence. Categories of those symbols include information used to manage operation of the decoder (510), and potentially information to control a rendering device such as a display (512) that is not an integral part of the decoder but can be coupled to it, as was shown in FIG. 6. The control information for the rendering device(s) may be in the form of Supplementary Enhancement Information (SEI messages) or Video Usability Information (VUI) parameter set fragments (not depicted). The parser (620) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (620) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter (QP) values, motion vectors, and so forth.

The parser (620) may perform entropy decoding/parsing operation on the video sequence received from the buffer (615), so to create symbols (621). The parser (620) may receive encoded data, and selectively decode particular symbols (621). Further, the parser (620) may determine whether the particular symbols (621) are to be provided to a Motion Compensation Prediction unit (653), a scaler/inverse transform unit (651), an Intra Prediction Unit (652), or a loop filter (656).

Reconstruction of the symbols (621) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (620). The flow of such subgroup control information between the parser (620) and the multiple units below is not depicted for clarity.

Beyond the functional blocks already mentioned, decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (651). The scaler/inverse transform unit (651) receives quantized transform coefficient as well as control information, including which transform to use, block size, quantization factor, quantization scaling matrices, etc. as symbol(s) (621) from the parser (620). It can output blocks comprising sample values, that can be input into aggregator (655).

In some cases, the output samples of the scaler/inverse transform (651) can pertain to an intra coded block; that is: a block that is not using predictive information from previously reconstructed pictures, but can use predictive information from previously reconstructed parts of the current picture. Such predictive information can be provided by an intra picture prediction unit (652). In some cases, the intra picture prediction unit (652) generates a block of the same size and shape of the block under reconstruction, using surrounding already reconstructed information fetched from the current (partly reconstructed) picture (656). The aggregator (655), in some cases, adds, on a per sample basis, the prediction information the intra prediction unit (652) has generated to the output sample information as provided by the scaler/inverse transform unit (651).

In other cases, the output samples of the scaler/inverse transform unit (651) can pertain to an inter coded, and potentially motion compensated block. In such a case, a Motion Compensation Prediction unit (653) can access reference picture memory (657) to fetch samples used for prediction. After motion compensating the fetched samples in accordance with the symbols (621) pertaining to the block, these samples can be added by the aggregator (655) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (621) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (655) can be subject to various loop filtering techniques in the loop filter unit (656). Video compression technologies can include in-loop filter technologies that are controlled by parameters included in the coded video bitstream and made available to the loop filter unit (656) as symbols (621) from the parser (620), but can also be responsive to meta-information obtained during the decoding of previous (in decoding order) parts of the coded picture or coded video sequence, as well as responsive to previously reconstructed and loop-filtered sample values.

The output of the loop filter unit (656) can be a sample stream that can be output to the render device (512) as well as stored in the reference picture memory (656) for use in future inter-picture prediction.

Certain coded pictures, once fully reconstructed, can be used as reference pictures for future prediction. Once a coded picture is fully reconstructed and the coded picture has been identified as a reference picture (by, for example, parser (620)), the current reference picture (656) can become part of the reference picture buffer (657), and a fresh current picture memory can be reallocated before commencing the reconstruction of the following coded picture.

The video decoder (510) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (610) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

FIG. 6 may be a functional block diagram of a video encoder (503) according to an embodiment of the present disclosure.

The encoder (503) may receive video samples from a video source (501) (that is not part of the encoder) that may capture video image(s) to be coded by the encoder (503).

The video source (501) may provide the source video sequence to be coded by the encoder (503) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (501) may be a storage device storing previously prepared video. In a videoconferencing system, the video source (503) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder (503) may code and compress the pictures of the source video sequence into a coded video sequence (743) in real time or under any other time constraints as required by the application. Enforcing appropriate coding speed is one function of Controller (750). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (750) as they may pertain to video encoder (503) optimized for a certain system design.

Some video encoders operate in what a person skilled in the art readily recognizes as a "coding loop." As an over-simplified description, a coding loop can consist of the encoding part of an encoder (730) ("source coder" henceforth) (responsible for creating symbols based on an input picture to be coded, and a reference picture(s)), and a (local) decoder (733) embedded in the encoder (503) that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory (734). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (733) can be the same as of a "remote" decoder (510), which has already been described in detail above in conjunction with FIG. 6. Briefly referring also to FIG. 6, however, as symbols are available and en/decoding of symbols to a coded video sequence by entropy coder (745) and parser (620) can be lossless, the entropy decoding parts of decoder (510), including channel (612), receiver (610), buffer (615), and parser (620) may not be fully implemented in local decoder (733).

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder (730) may perform motion compensated predictive coding, which codes an input frame predictively with reference to one or more previously-coded frames from the video sequence that were designated as "reference frames." In this manner, the coding engine (732) codes differences between pixel blocks of an input frame and pixel blocks of reference frame(s) that may be selected as prediction reference(s) to the input frame.

The local video decoder (733) may decode coded video data of frames that may be designated as reference frames, based on symbols created by the source coder (730). Operations of the coding engine (732) may advantageously be lossy processes. When the coded video data may be decoded at a video decoder (not shown in FIG. 6), the reconstructed video sequence typically may be a replica of the source video sequence with some errors. The local video decoder (733) replicates decoding processes that may be performed by the video decoder on reference frames and may cause reconstructed reference frames to be stored in the reference picture cache (734). In this manner, the encoder (503) may store copies of reconstructed reference frames locally that have common content as the reconstructed reference frames that will be obtained by a far-end video decoder (absent transmission errors).

The predictor (735) may perform prediction searches for the coding engine (732). That is, for a new frame to be coded, the predictor (735) may search the reference picture memory (734) for sample data (as candidate reference pixel blocks) or certain metadata such as reference picture motion vectors, block shapes, and so on, that may serve as an appropriate prediction reference for the new pictures. The predictor (735) may operate on a sample block-by-pixel block basis to find appropriate prediction references. In some cases, as determined by search results obtained by the predictor (735), an input picture may have prediction references drawn from multiple reference pictures stored in the reference picture memory (734).

The controller (750) may manage coding operations of the video coder (730), including, for example, setting of parameters and subgroup parameters used for encoding the video data.

Output of all aforementioned functional units may be subjected to entropy coding in the entropy coder (745). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (740) may buffer the coded video sequence(s) as created by the entropy coder (745) to prepare it for transmission via a communication channel (760), which may be a hardware/software link to a storage device which would store the encoded video data. The transmitter (740) may merge coded video data from the video coder (730) with other data to be transmitted, for example, coded audio data and/or ancillary data streams (sources not shown).

The controller (750) may manage operation of the encoder (503). During coding, the controller (750) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (503) may perform coding operations according to a predetermined video coding technology or standard, such as ITU-T Rec. H.265. In its operation, the video coder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (740) may transmit additional data with the encoded video. The video coder (730) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Some embodiments of the present disclosure allow to concatenate two or more spatially neighboring CUs in any tree structure (such as in MTT) so that the concatenated CUs become a single CU which is regarded as a regular CU and has regular CU level syntax elements and coding tools.

The CU concatenation may be constrained such that the shape of the new CU is a rectangular shape or/and the size of new CU is supported by available transforms.

In one embodiment, a concatenation is not allowed if the concatenated CU is larger than the maximal CU size. In another embodiment, a concatenation is not allowed if there are no transform fits for either the width or the height of the concatenated CU even if the concatenated CU is smaller than the maximal CU size. For example, the two neighboring CUs are 16×16 and 16×4. The concatenated CU is 16×20. If no 20-point transform is available, the new concatenated CU is not allowed even if the maximal CU size may be 128×128.

In an embodiment, if the concatenated CU height and/or width does not fit an available transform size, the CU may be split into two or more sub-blocks so that each sub-block height and width fits an available transform size. How the CU is split into sub-blocks may be signaled or pre-defined.

In an embodiment, CU concatenation may be constrained such that a CU can only concatenate to the CUs which share the same parent as the current CU.

In an embodiment, the direction of CU concatenation may be constrained such that a CU can only concatenate to the CU on its right or at its bottom.

For a block that is split into more than 2 sub-blocks (such as TT), embodiments of the present disclosure allow to concatenate two or more partitions which are not adjacent to each other, and the residuals of the concatenated partitions may be put together as one block for further processing including transform and motion compensation.

Figure 8:
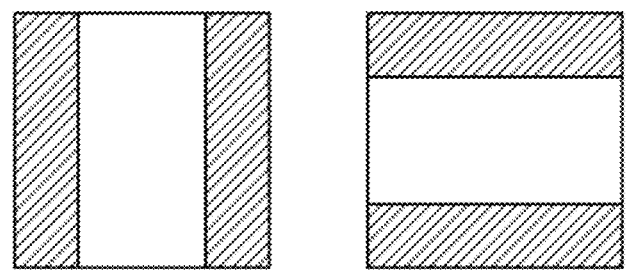
FIG. 8 is an illustration of concatenation of non-adjacent sub-blocks, according to an embodiment of the present disclosure.

In an embodiment, if an M×N block is split into 3 sub-blocks, such as TT, as shown in FIG. 8, the two smaller partitions M/4×N (horizontal center-side TT) or M×N/4 (vertical center-side TT), which are illustrated using shadowed blocks, are put together to form one M/2×N (horizontal center-side TT) block or M×N/2 (vertical center-side TT) block. In this case, the coding/decoder order of these three sub-blocks may be changed, such as code/decode the concatenated two side sub-blocks first and then the center sub-block, or code/decode the center sub-block first and then the two concatenated two side sub-blocks.

In an embodiment, if the concatenation of two or more non-adjacent sub-blocks is applied, the motion information of the spatially neighboring right and bottom block may be also used for motion compensation when they are available.

In an embodiment, if the two smaller sub-blocks M/4×N of a horizontal center-side TT are put together as one M/2×N sub-block, and is coded before the center M/2×N-sub-block of the TT, when predicting the motion information for the center partition, the motion from its right M/4×N-sub-block, which is involved in the concatenation, may be used.

Embodiments of the present disclosure may signal whether the feature of CU/block concatenation is enabled or disabled in bitstream, such as in sequence parameter set (SPS), picture parameter set (PPS), or/and slice header. Combinations of different CU/block concatenations which are allowed/disallowed may be signaled in bitstream such as in SPS, PPS, or/and slice header.

In an embodiment, CU concatenation may be used to mimic ABT on top of TT. In this embodiment, ABT partitioning is mimicked with the proposed CU concatenation on top of TT partitioning.

Figure 9:
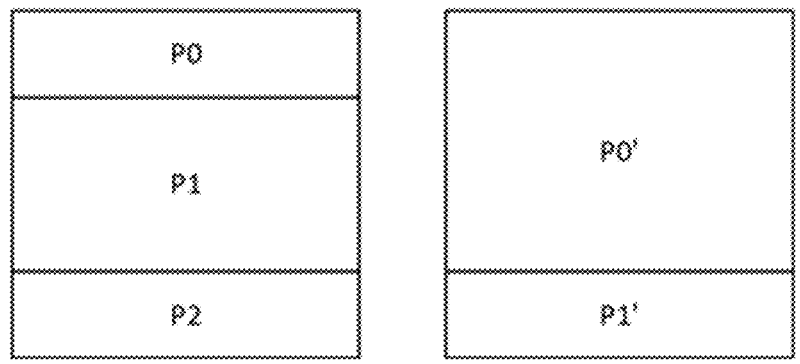
FIG. 9 is an illustration of an example of partitioning and concatenating various CUs, according to an embodiment of the present disclosure.

Suppose after a TT split there are three partitions P0, P1 and P2, as shown in on the left side of FIG. 9. While for this block, ABT partitioning as shown in the right figure above is more efficient. The target is to use CU concatenation to mimic ABT partitioning P0' and P1'.

In this embodiment, in addition to regular syntax elements for TT partitions, a new flag cu_concat_flag may be signaled to indicate whether a CU is concatenated to the next CU for the first two CUs out of the three CUs by a TT split. In the example above, cu_concat_flag is true for P0 so that P0 and P1 in the left figure are concatenated as P0' in the right figure and P2 becomes P1'. Consequently, the ABT partition may be mimicked by TT with CU concatenation.

The related syntax table may be based on the pseudo code below. It should be mentioned that in the pseudo code below, no further split is allowed for concatenated CUs since function coding_unit( ) is used. Alternatively, concatenated CUs may be further split. In this case, function coding_tree_unit is used instead of coding_unit( ).

```
coding_tree_unit(x0,y0,w0,h0,cuDepth)
{
    splitType = parse_tree_type( );
    if(splitType == NoSplit)
    {
        coding_unit(x0,y0,w0,h0,cuDepth);
    }
    else if(splitType == QuadTreeSplit)
    {
        coding_tree_unit(x0,y0,w0/2,h0/2,cuDepth+1);
        coding_tree_unit(x0+w0/2,y0,w0/2,h0/2,cuDepth+1);
        coding_tree_unit(x0,y0+h0/2,w0/2,h0/2,cuDepth+1);
        coding_tree_unit(x0+w0/2,y0+y0/2,w0/2,h0/2,cuDepth+1);
    }
    else if(splitType == BinTreeSplitVer)
    {
        coding_tree_unit(x0,y0,w0/2,h0,cuDepth+1);
        coding_tree_unit(x0+w0/2,y0,w0/2,h0,cuDepth+1);
    }
    else if(splitType == BinTreeSplitHor)
    {
        coding_tree_unit(x0,y0,w0,h0/2,cuDepth+1);
        coding_tree_unit(x0,y0+h0/2,w0,h0/2,cuDepth+1);
    }
    else if(splitType == TriTreeSplitVer)
    {
        cu_concat_flag0 = parse_cu_concat_flag( );
        if(cu_concat_flag0)
        {
            coding_unit(x0,y0,w0*3/4,h0,cuDepth);
            coding_tree_unit(x0+w0*3/4,y0,w0/4,h0,cuDepth+1);
        }
        else
        {
            coding_tree_unit(x0,y0,w0/4,h0,cuDepth+1);
            cu_concat_flag1 = parse_cu_concat_flag( );
            if(cu_concat_flag1)
            {
                coding_unit(x0+w0/4,y0,w0*3/4,h0,cuDepth);
            }
            else
            {
                coding_tree_unit(x0+w0/4,y0,w0/2,h0,cuDepth+1);
                coding_tree_unit(x0+w0*3/4,y0,w0/4,h0,cuDepth+1);
            }
        }
    }
    else if(splitType == TriTreeSplitHor)
    {
        cu_concat_flag0 = parse_cu_concat_flag( );
        if(cu_concat_flag0)
        {
            coding_unit(x0,y0,w0,h0*3/4,cuDepth);
            coding_tree_unit(x0,y0+h0*3/4,w0,h0/4,cuDepth+1);
        }
        else
        {
            coding_tree_unit(x0,y0,w0,h0/4,cuDepth+1);
            cu_concat_flag1 = parse_cu_concat_flag( );
            if(cu_concat_flag1)
            {
                coding_unit(x0,y0+h0/4,w0,h0*3/4,cuDepth);
            }
            else
            {
                coding_tree_unit(x0,y0+h0/4,w0,h0/2,cuDepth+1);
                coding_tree_unit(x0,y0+h0*3/4,w0,h0/4,cuDepth+1);
            }
        }
    }
}
```

Figure 10:
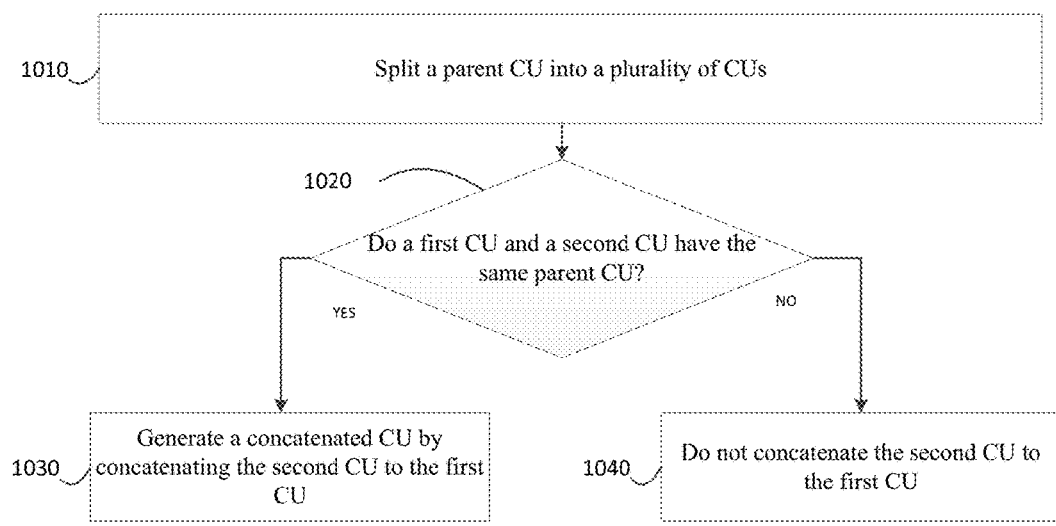
FIG. 10 is a flowchart of an example process for partitioning a parent CU in a tree structure for encoding a video sequence, according to an embodiment of the present disclosure.

FIG. 10 is a flowchart is a flowchart of an example process 1000 for generating a merge candidate list using middle candidates. In some implementations, one or more process blocks of FIG. 10 may be performed by decoder 510. In some implementations, one or more process blocks of FIG. 10 may be performed by another device or a group of devices separate from or including decoder 510, such as encoder 503.

In an embodiment, process 1000 may include partitioning a parent coding unit (CU) in a tree structure for encoding a video sequence by splitting the parent CU into more than two CUs including a first CU and a second CU, and generating a concatenated CU by concatenating the second CU to the first CU.

For example, as shown in FIG. 10, process 1000 may include splitting a CU into a plurality of CUs, for example at more than two CUs. (block 1010). The plurality of CUs may include a first CU and a second CU.

As further shown in FIG. 10, process 1000 may include determining whether the first CU and the second CU have the same parent CU. (block 1020).

As further shown in FIG. 10, process 1000 may include generating a concatenated CU by concatenating the first CU and the second CU if the first CU and the second CU have the same parent CU (block 1030).

As further shown in FIG. 10, process 1000 may include not generating the concatenated CU if the first CU and the second CU do not have the same parent CU (block 1040).

In an embodiment, at least one from among CU-level syntax elements or CU-level coding tools are applied to the concatenated CU.

In an embodiment, the second CU is spatially adjacent to the first CU.

In an embodiment, the second CU is located on at least one from among a right side of the first CU, or a bottom side of the first CU.

In an embodiment, the second CU is selected so that a size of the concatenated CU is smaller than a maximum CU size, and so that the size of the concatenated CU fits an available transform size.

In an embodiment, if a size of the concatenated CU does not fit an available transform size, the concatenated CU may be split into a plurality of sub-blocks, wherein each of the plurality of sub-blocks fits the available transform size.

In an embodiment, the tree structure includes at least one from among a quad-tree-binary-tree structure, a ternary-tree structure, a multi-type tree structure, and an asymmetric binary tree structure.

In an embodiment, the tree structure comprises a ternary-tree structure, the more than two CUs may include a third CU, and the third CU may be located between the first CU and the second CU. The first CU may be located to on a left side of the third CU, the second CU may be located on a right side of the third CU, and motion information of the first CU may be used for motion compensation of the second CU.

In an embodiment, at least one from among a sequence parameter set (SPS), picture parameter set (PPS), or a slice header includes an indication that concatenation is allowed.

In an embodiment, the first CU and the second CU are only able to concatenate with other CUs which are split from the same parent CU.

Although FIG. 10 shows example blocks of process 1000, in some implementations, process 1000 may include additional blocks, fewer blocks, different blocks, or differently arranged blocks than those depicted in FIG. 10. Additionally, or alternatively, two or more of the blocks of process 1000 may be performed in parallel.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above, can be implemented as computer software using computer-readable instructions and physically stored in one or more computer-readable media. For example, FIG. 11 shows a computer system 1100 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 11 for computer system 1100 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 1100.

Computer system 1100 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1101, mouse 1102, trackpad 1103, touch screen 1110, data-glove 1104, joystick 1105, microphone 1106, scanner 1107, camera 1108.

Computer system 1100 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1110, data-glove 1104, or joystick 1105, but there can also be tactile feedback devices that do not serve as input devices), audio output devices (such as: speakers 1109, headphones (not depicted)), visual output devices (such as screens 1110 to include cathode ray tube (CRT) screens, liquid-crystal display (LCD) screens, plasma screens, organic light-emitting diode (OLED) screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 1100 can also include human accessible storage devices and their associated media such as optical media including CD/DVD ROM/RW 1120 with CD/DVD or the like media 1121, thumb-drive 1122, removable hard drive or solid state drive 1123, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1100 can also include interface(s) to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1149) (such as, for example universal serial bus (USB) ports of the computer system 1100; others are commonly integrated into the core of the computer system 1100 by attachment to a system bus as described below (for example Ethernet interface into a PC computer system or cellular network interface into a smartphone computer system). Using any of these networks, computer system 1100 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 1140 of the computer system 1100.

The core 1140 can include one or more Central Processing Units (CPU) 1141, Graphics Processing Units (GPU) 1142, specialized programmable processing units in the form of Field Programmable Gate Areas (FPGA) 1143, hardware accelerators for certain tasks 1144, and so forth. These devices, along with Read-only memory (ROM) 1145, Random-access memory (RAM) 1146, internal mass storage such as internal non-user accessible hard drives, solid-state drives (SSDs), and the like 1147, may be connected through a system bus 1148. In some computer systems, the system bus 1148 can be accessible in the form of one or more physical plugs to enable extensions by additional CPUs, GPU, and the like. The peripheral devices can be attached either directly to the core's system bus 1148, or through a peripheral bus 1149. Architectures for a peripheral bus include peripheral component interconnect (PCI), USB, and the like.

CPUs 1141, GPUs 1142, FPGAs 1143, and accelerators 1144 can execute certain instructions that, in combination, can make up the aforementioned computer code. That computer code can be stored in ROM 1145 or RAM 1146. Transitional data can be also be stored in RAM 1146, whereas permanent data can be stored for example, in the internal mass storage 1147. Fast storage and retrieve to any of the memory devices can be enabled through the use of cache memory, that can be closely associated with one or more CPU 1141, GPU 1142, mass storage 1147, ROM 1145, RAM 1146, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 1100, and specifically the core 1140 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 1140 that are of non-transitory nature, such as core-internal mass storage 1147 or ROM 1145. The software implementing various embodiments of the present disclosure can be stored in such devices and executed by core 1140. A computer-readable medium can include one or more memory devices or chips, according to particular needs. The software can cause the core 1140 and specifically the processors therein (including CPU, GPU, FPGA, and the like) to execute particular processes or particular parts of particular processes described herein, including defining data structures stored in RAM 1146 and modifying such data structures according to the processes defined by the software. In addition or as an alternative, the computer system can provide functionality as a result of logic hardwired or otherwise embodied in a circuit (for example: accelerator 1144), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The invention claimed is:

1. A method of partitioning a parent coding unit (CU) in a tree structure for encoding a video sequence, the method comprising:
    splitting the parent CU into more than two CUs including a first CU and a second CU; and
    generating a concatenated CU by concatenating the second CU to the first CU,
    wherein the generating of the concatenated CU comprises creating the concatenated CU, wherein the concatenated CU includes only the second CU and the first CU.

2. The method of claim 1, wherein at least, one from among CU-level syntax elements or CU-level coding tools are applied to the concatenated CU.

3. The method of claim 1, wherein the second CU is spatially adjacent to the first CU.

4. The method of claim 3, wherein the second CU is located on at least one from among a right side of the first CU, or a bottom side of the first CU.

5. The method of claim 1, wherein the second CU is selected so that a size of the concatenated CU is smaller than a maximum CU size, and so that the size of the concatenated CU fits an available transform size.

6. The method of claim 1, wherein if a size of the concatenated CU does not fit an available transform size, the method further comprises splitting the concatenated CU into a plurality of sub-blocks, wherein each of the plurality of sub-blocks fits the available transform size.

7. The method of claim 1, wherein the tree structure comprises at least one from among a quad-tree-binary-tree structure, a ternary-tree structure, a multi-type tree structure, and an asymmetric binary tree structure.

8. The method of claim 1, wherein the tree structure comprises a ternary-tree structure,
    wherein the more than two CUs include a third CU, and
    wherein the third CU is located between the first CU and the second CU.

9. The method of claim 8, wherein the first CU is located to on a left side of the third CU, wherein the second CU is located on a right side of the third CU, and wherein motion information of the first CU is used for motion compensation of the second CU.

10. The method of claim 1, wherein at least one from among a sequence parameter set (SPS), picture parameter set (PPS), or a slice header includes an indication that concatenation is allowed.

11. The method of claim 1, wherein the first CU and the second CU are only able to concatenate with other CUs which are split from the parent CU.

12. A device for partitioning a parent coding unit (CU) in a tree structure for encoding a video sequence, the device comprising:
    at least one memory configured to store program code; and
    at least one processor configured to read the program code and operate as instructed by the program code, the program code including:
        splitting code configured to cause the at least one processor to split the parent CU into more than two CUs including a first CU and a second CU; and
        generating code configured to cause the at least one processor to generate a concatenated CU by concatenating the second CU to the first CU,
    wherein the generating code further comprises creating code configured to cause the at least one processor to create the concatenated CU, wherein the concatenated CU includes only the second CU and the first CU.

13. The device of claim 12, wherein at least one from among CU-level syntax elements or CU-level coding tools are applied to the concatenated CU.

14. The device of claim 12, wherein the second CU is spatially adjacent to the first CU.

15. The device of claim 14, wherein the second CU is located on at least one from among a right side of the first CU, or a bottom side of the first CU.

16. The device of claim 12, wherein the second CU is selected so that a size of the concatenated CU is smaller than a maximum CU size, and so that the size of the concatenated CU fits an available transform size.

17. The device of claim 12, wherein if a size of the concatenated CU does not fit an available transform size, then the splitting code is configured to cause the at least one processor to split the concatenated CU into a plurality of sub-blocks, wherein each of the plurality of sub-blocks fits the available transform size.

18. The device of claim 12, wherein the tree structure comprises at least one from among a quad-tree-binary-tree structure, a ternary-tree structure, a multi-type tree structure, and an asymmetric binary tree structure.

19. The device of claim 12, wherein at least one from among a sequence parameter set (SPS), picture parameter set (PPS), or a slice header includes an indication that concatenation is allowed.

20. A non-transitory computer-readable medium storing instructions, the instructions comprising: one or more instructions that, when executed by one or more processors of a device for partitioning a parent coding unit (CU) in a tree structure for encoding a video sequence, cause the one or more processors to:
  split the parent CU into more than two CUs including a first CU and a second CU; and
  generate a concatenated CU by concatenating the second CU to the first CU,
  wherein the generating of the concatenated CU comprises creating the concatenated CU, wherein the concatenated CU includes only the second CU and the first CU.

21. The method of claim 1, wherein the more than two CUs further include a third CU, and
  wherein the concatenated CU does not include the third CU.

* * * * *